Patented Apr. 1, 1924.

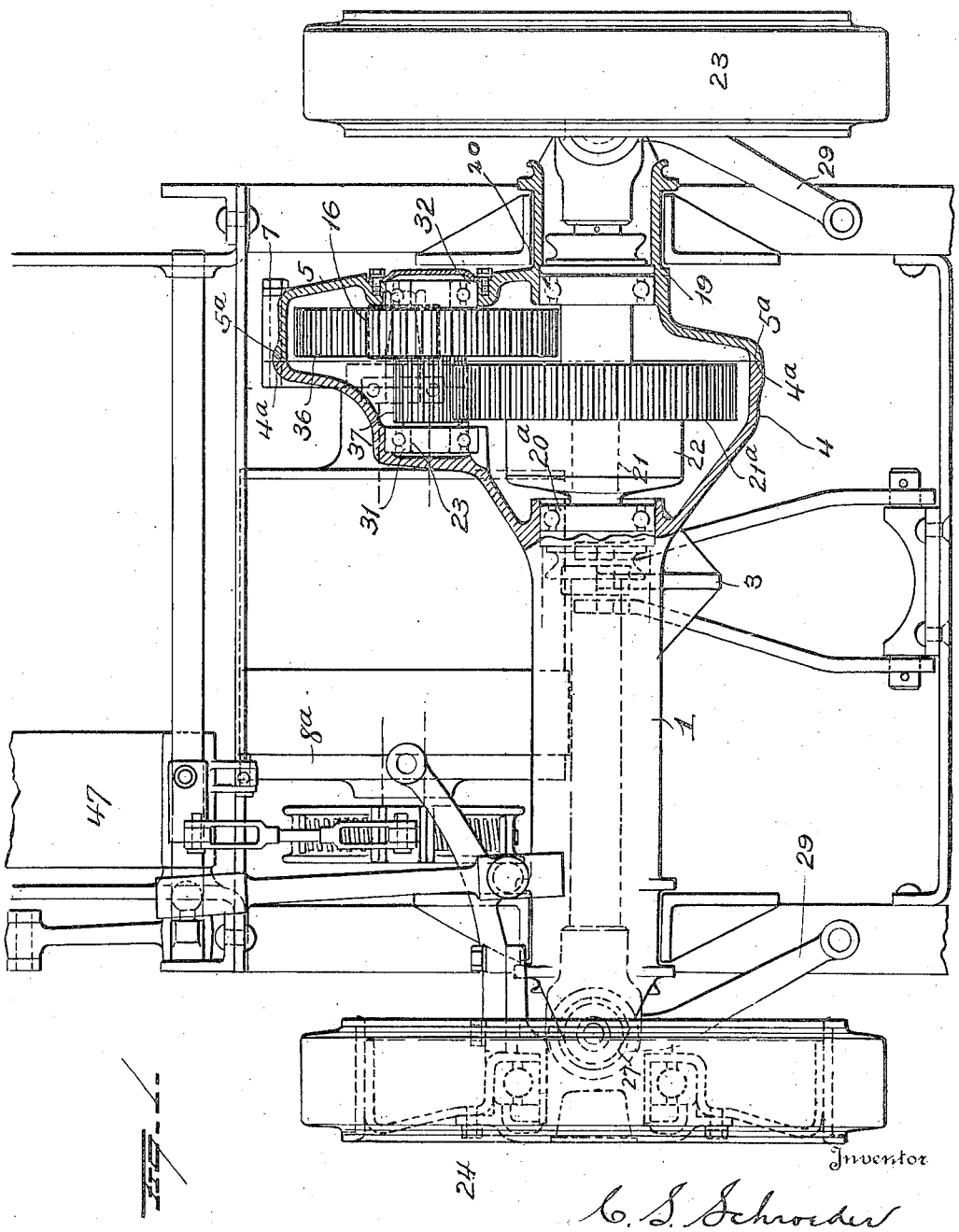

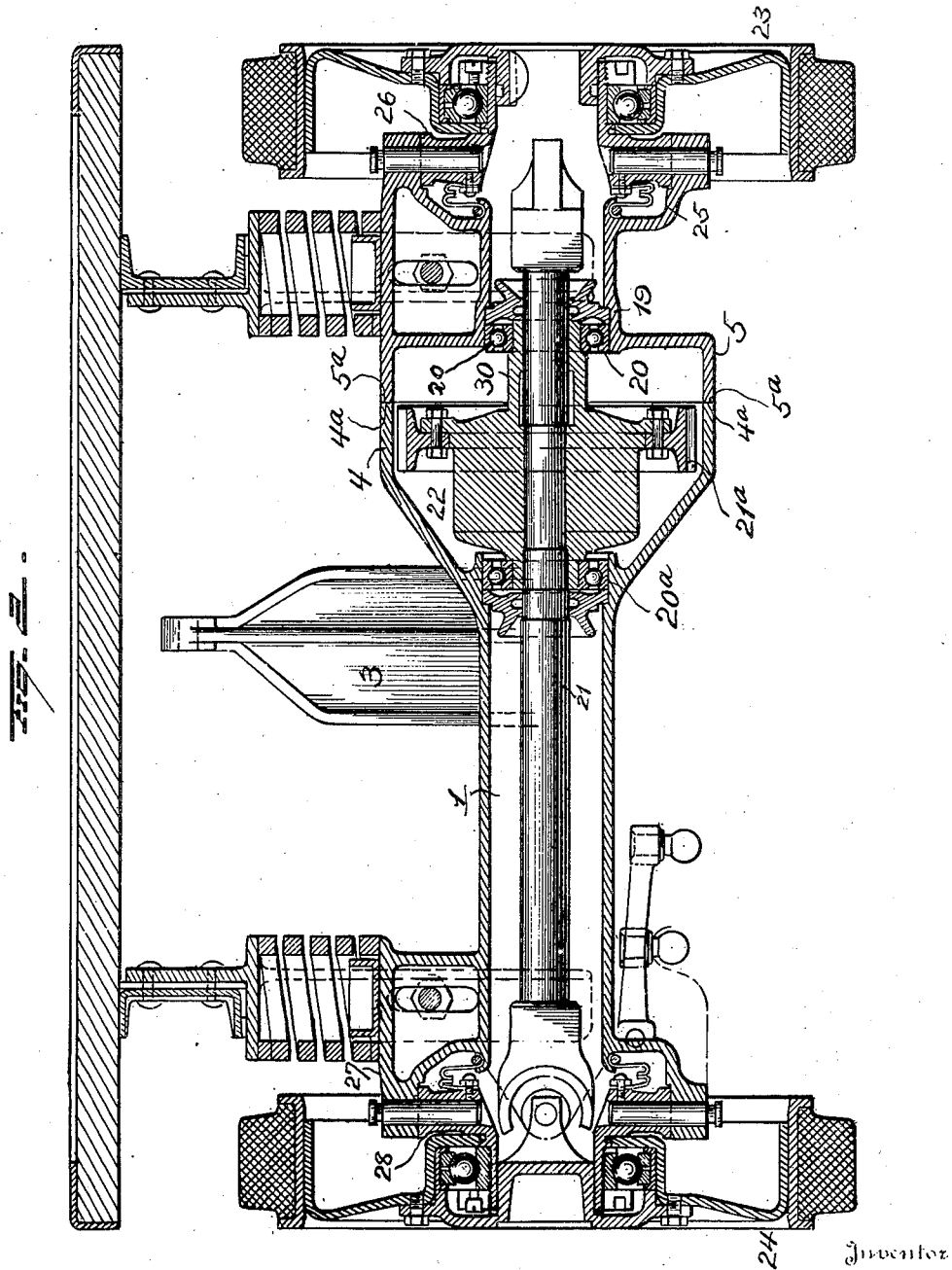

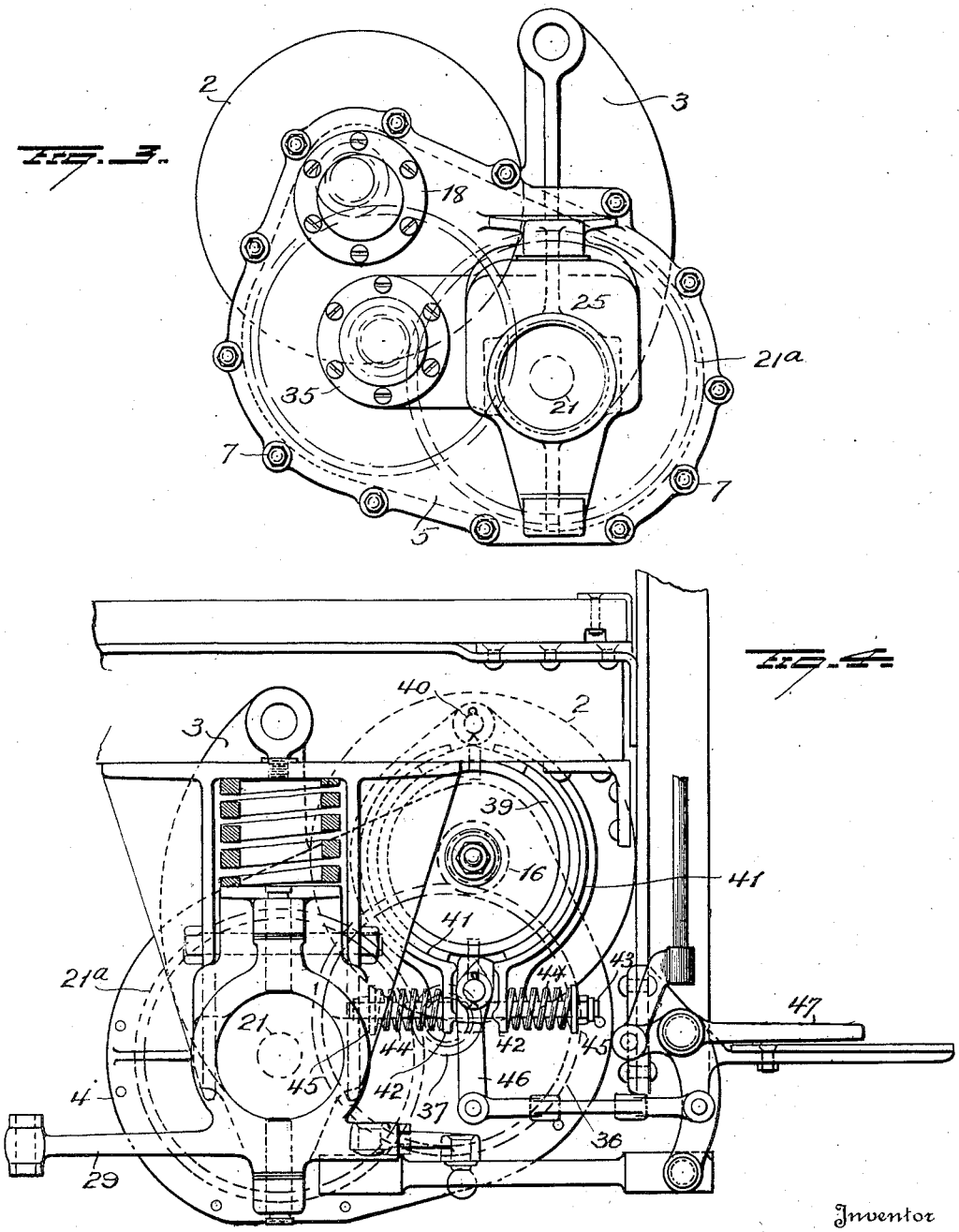

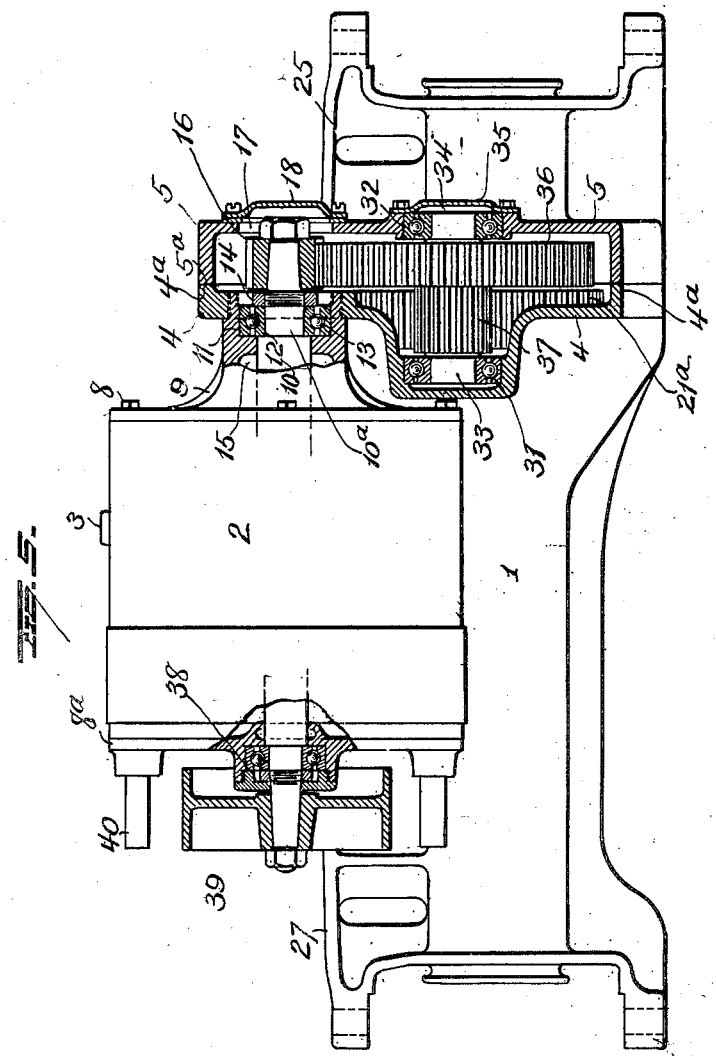

1,488,839

UNITED STATES PATENT OFFICE.

CHARLES S. SCHROEDER, OF STAMFORD, CONNECTICUT, ASSIGNOR TO THE YALE & TOWNE MANUFACTURING COMPANY, OF STAMFORD, CONNECTICUT.

DRIVING MEANS FOR MOTOR VEHICLES.

Application filed November 28, 1921. Serial No. 518,318.

*To all whom it may concern:*

Be it known that I, CHARLES S. SCHROEDER, a citizen of the United States, and a resident of Stamford, in the county of Fairfield and State of Connecticut, have invented certain new and useful Improvements in Driving Means for Motor Vehicles; and I do hereby declare the following to be a full, clear, and exact description of the invention, such as will enable others skilled in the art to which it appertains to make and use the same.

This invention relates to improvements in driving means for motor vehicles and more particularly to an improved drive unit which shall be eminently adapted for use with industrial trucks,—one object of the invention being to provide a self-contained, compact and efficient drive unit which shall have its mechanism so disposed as to make it applicable to many various types of vehicles without the necessity of specially adapting parts or special arrangement of assembly.

A further object is to so construct and arrange the parts of a drive unit as to maintain a minimum of space occupied by overlapping gears, differential, etc., and so that the electric motor shall be disposed parallel with the drive axle where it shall project only slightly beyond the diameter of the driving wheels.

A further object is to construct the drive unit in such manner that the motor and gear centers shall all be held in rigid alignment when subjected to severe strain and so that alignment shall not be changed after the mechanism has been disassembled for repairs and a subsequently re-assembled.

With these and other objects in view, the invention consists in certain novel features of construction and combinations of parts as hereinafter set forth and pointed out in the claims.

In the accompanying drawings; Figure 1 is a bottom plan view partly in section; Figure 2 is a longitudinal section view; Figures 3 and 4 are end views and Figure 5 is a view in elevation of the casing partly in section.

The framework of my improved drive unit includes a main casing 1, on which the frame or casing 2 of an electric motor is mounted,—said casing 1 being provided intermediate of its ends with a torque arm 3 (having suitable bracing ribs) and to this arm, the body of the motor casing is securely bolted,—the whole of this structure being suitably supported by the framework of the truck and so disposed that the motor will be parallel with the driving axle and so that the structure will project but slightly beyond the diameter of the wheels of the truck.

The casing 1 is formed at one end with an enlargement, providing one member 4 of a gear casing having a machined face $4^a$ around its edge portion, and the other member 5 of said casing is also provided with a machined edge face portion $5^a$ so that when the two members of said casing shall have been assembled and secured together by bolts 7, the proper and accurate alignment of the bearings for gearing mounted in said casing will be insured, both when the parts are initially assembled and when one member of the casing has been removed to facilitate repairs and then replaced.

The head 8 of the motor casing 2 (which is securely bolted to the body of the latter) is provided with an enlargement 9 which enters a suitable hole in the gear casing member 4 and provides a bearing member through which the shaft 10 of the motor passes. A bearing ring 11 is located within the enlargement or bearing member 9 and between this ring and a bearing ring 12 on the shank $10^a$ of the motor shaft, antifriction balls 13 are located. These ball bearing devices may conveniently be held in place by a retaining ring 14 threaded on the shank of the motor shaft and entering the enlargement or bearing member 9, and the latter may be provided interiorly with a groove 15 to receive packing material. The shank of the motor shaft terminates within the gear casing and has secured thereto, a pinion 16 to which access may be had through an opening 17 in the casing member 5, said opening being normally closed by a removable cover plate 18.

The casing member 5 is made with a hub portion 19, having seated therein, anti-friction bearing devices 20 for a driving axle 21, a differential 22 and a driving gear $21^a$ thereon,—a hub 30 being provided to enter said bearing devices. The axle 21 is housed in the casing 1 and anti-friction bearing devices $20^a$ are provided for said axle and differential within the housing. One end portion of the driving axle 21 is connected with one of the wheels 23 of the truck and the opposite wheel 24 of the truck is similarly connected with the driving axle.

At one end of the unit, a bracket 25 may be made rigid with the casing member 5 so as to provide arms above and below the hub portion 19, and between these arms, a knuckle 26 is pivotally mounted for connection with the wheel 23. At the opposite end of the unit, a similar bracket 27 is provided to receive the pivoted knuckle 28 for the wheel 24 and the two knuckles are provided with arms 29 for connection with the steering mechanism of the truck.

The driving gear 21$^a$ above mentioned, is located within the member 4 of the gear casing, and connected through the differential with the driving axle.

The gear casing members 4 and 5 carry ball bearing devices 31 and 32 respectively, for a short shaft 33 and the gear casing member 5 may be provided with an opening 34 in line with this shaft to facilitate access to the interior of the casing at this point and said opening is normally covered by removable cover plate 35. The short shaft 33 has rigid therewith, an intermediate gear wheel 36 which receives motion from the pinion 16 on the motor shaft and overlaps the driving gear 21$^a$. The short shaft 33 also carries a fixed pinion 37 which meshes with and transmits motion to the driving gear 21$^a$.

The shaft 10 of the motor passes through the head 8$^a$ (at the opposite end of the motor casing from the head 8) and said head 8$^a$ is provided with ball-bearing devices 38 for this end portion of the motor shaft. The shank at this end of the motor shaft projects beyond its mounting and has secured thereto, a brake wheel 39. A pin 40 projecting from the motor casing head 8$^a$ serves as a mounting for brake shoes 41 which embrace the brake wheel and these brake shoes are provided with arms 42 through which a rod 43 passes. Springs 44 located on this rod, bear respectively, against the respective arms 44 and against adjustable abutments 45 on said rods and serve to effect application of the brake shoes to the brake wheel. A lever 46 is pivotally mounted between the arms of the brake shoes and is cooperable with the latter to move the same away from the brake wheel, and said lever 46 may be connected with a pedal lever 47 for operating it.

My improvements provide in a simple and compact structure, a drive unit which is particularly adaptable for use with industrial trucks of various types; which shall occupy small space; which may easily be mounted on trucks of different types without necessity for making extensive alterations in the same to receive said unit; in which proper alignment of the bearings of the rotating parts shall be effectively maintained; and which shall be accurate and reliable in operation, and easy to control.

It is evident that the trailer wheels as well as the driving wheels of a truck may be so mounted as to constitute steering wheels and my improved drive unit is well adapted for use with trucks of this type.

Various changes might be made in the details of construction of my invention without departing from the spirit thereof or limiting its scope and hence I do not wish to restrict myself to the precise details herein set forth.

Having fully described my invention what I claim as new and desire to secure by Letters Patent, is:—

1. A gear unit of the character described, comprising a casing adapted to be disposed between the wheels of a truck, said casing having an enlarged portion at one end, constituting a gear housing, said enlarged portion of the casing including a removable member, a knuckle bracket rigid with said removable member of the casing, a knuckle bracket rigid with the other end of the casing, a motor parallel with said casing and having its frame rigidly connected therewith, an axle having mountings in said casing, a short shaft mounted in the gear housing portion of the casing, intermeshing gears in said housing portion between said short shaft and the shaft of the motor, and intermeshing gearing in said housing portion between said short shaft and said axle.

2. A drive unit comprising a main casing provided at one end with an integral gear casing member, a removable gear casing member, a motor having its frame rigid with said main casing, a driving axle housed in the main casing, gearing in the gear casing between the driving axle and the shaft of the motor, a bracket on the removable member of the gear casing, a knuckle pivoted to said bracket for connection with a wheel, and driving means for the wheel connected with the driving axle.

3. A drive unit comprising a main casing provided at one end with a gear casing, a bracket on a part of said gear casing, a bracket at the opposite end of the main casing, knuckles for attachment to wheels, pivoted to the respective brackets, a driving axle housed in the main casing, means for connecting said axle with oppositely disposed wheels, a motor having its frame rigid with said main casing, and gearing in the gear casing, between the shaft of the motor and the driving axle.

In testimony whereof, I have signed this specification in the presence of two subscribing witnesses:

CHARLES S. SHROEDER.

Witnesses:
CARL H. MUELLER,
WILLARD M. TAYLOR.